Figure 1:
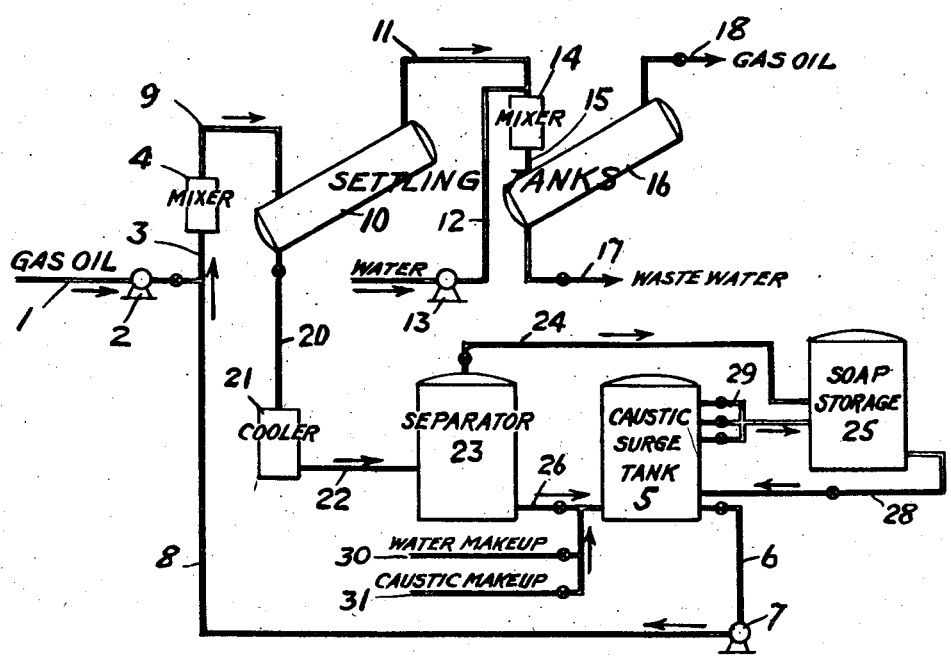

Patented June 24, 1947

2,422,794

UNITED STATES PATENT OFFICE 2,422,794

EXTRACTION OF SAPONIFIABLE ACIDS

Wilmer E. McCorquodale, Jr., Ardentown, Del., and Lloyd G. Magill, Chester, and James D. Hagy, Wallingford, Pa., assignors to Sun Oil Company, Philadelphia, Pa., a corporation of New Jersey Application February 9, 1943, Serial No. 475,318

12 Claims. (Cl. 260—452)

1

The present invention relates to a method of extracting saponifiable acids from a mixture of such acids and unsaponifiable impurities and is particularly valuable for obtaining acids from dilute mixtures of such acids with neutral oils. It is thus particularly valuable for purifying and concentrating various types of saponifiable acids derived from petroleum such as naphthenic acids, sulfonic acids and acids obtained by partial oxidation of hydrocarbons. It frequently occurs that minor amounts of acids of this type are present in a relatively large amount of neutral hydrocarbon oils. A separation of the acids from the neutral oils by most processes requires a relatively large amount of reagents, a considerable portion of which may be lost, and not infrequently the acids are obtained in a dilute form so that their concentration is expensive.

The present invention is directed to a method whereby the acids are converted into their corresponding soaps and the soaps are obtained in a concentrated form and in which there is little or no loss of the reagents used in obtaining the concentrated soaps.

It frequently happens that saponifiable acids are needed for various purposes in the form of alkali metal soaps of the acids rather than as free acids. For many of these purposes the soaps are used in impure form, that is, containing relatively large amounts of neutral hydrocarbon oil. For example, in the manufacture of emulsifiable oils, soaps are often employed in admixture with as much as 90 per cent neutral oil. In other cases the soaps may contain 10 per cent to 60 per cent neutral oil depending on the purpose for which they are to be used. In such cases it is advantageous to recover the saponifiable material as relatively concentrated soaps which may then be used directly in the manufacture of the desired product, thereby eliminating any elaborate processing necessary for producing pure soaps or any loss of reagents which may be incurred if the saponifiable material is recovered as acids.

It is an object of the present invention to provide a method of obtaining soaps of saponifiable acids in a relatively concentrated form. It is a further object to provide a method which may be employed without any substantial loss of reagents in obtaining the concentrated soaps.

Another object is to provide a means of obtaining soaps of saponifiable acids in such form that further purification is relatively simple.

A still further object is to provide a method for extracting saponifiable materials from mixtures

2 containing a very small proportion of such materials.

Briefly stated, the present invention depends on the difference in solubility of the soaps of saponifiable acids in concentrated aqueous solutions of alkalis at a relatively high and a relatively low temperature.

Figure 2:
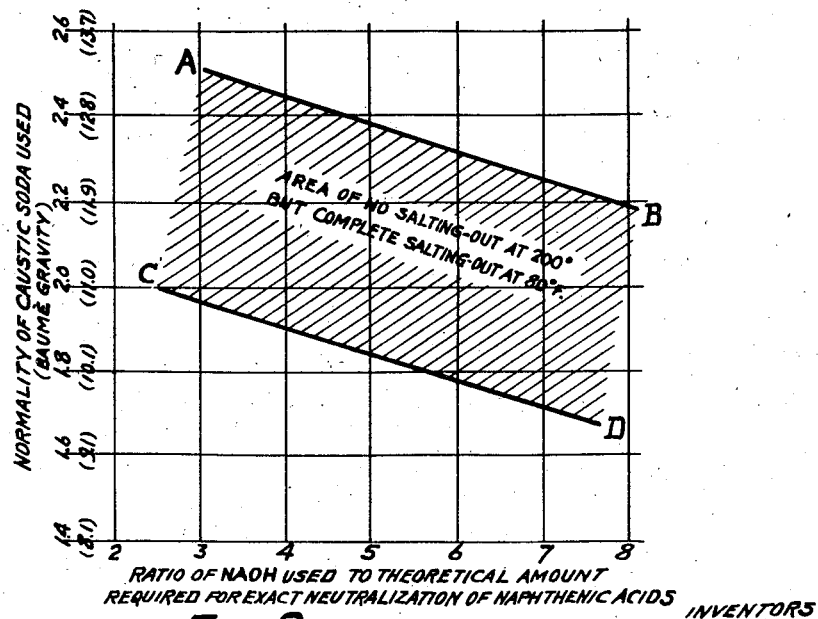

In order to more readily describe the present invention there is attached hereto as a part of this specification a sheet of drawings in which Figure 1 is a diagrammatic flow chart of the apparatus suitable for practicing the invention, while Figure 2 is a diagram of the optimum range of caustic strength.

Referring now to the drawings, a petroleum fraction which contains a relatively minor amount of naphthenic acids, generally less than two per cent and frequently a fraction of a per cent, and which for the purpose of illustration might be a gas oil fraction derived from a naphthenic type crude petroleum by fractional distillation, is introduced through valved line 1 by pump 2 to line 3 and flows to mixer 4 wherein it is mixed with relatively concentrated aqueous solution of an alkali metal hydroxide (NaOH or KOH), withdrawn from caustic surge tank 5 through valved line 6 by pump 7 and introduced through lines 8 and 3 into mixer 4. As will be more fully described hereinafter, a substantial excess of caustic is employed over that necessary to convert the naphthenic acids in the gas oil into their corresponding soaps. This mixing is carried out at an elevated temperature, for example at about 200° F., in order that the naphthenic acids will be converted quickly into their corresponding soaps and the thus formed soaps be dissolved in the excess of caustic solution present. From mixer 4 the mixed caustic, gas oil and soaps flow through line 9 to settling tank 10 wherein the gas oil separates from the caustic solution of soaps, the gas oil being removed from tank 10 through line 11 and preferably mixed in mixer 14 with wash water introduced through line 12 by pump 13 to mixer 14. The gas oil and water flow from mixer 14 through line 15 to settling tank 16, from which the water with any excess caustic is removed through valved line 17, while the gas oil is removed from the process through valved line 18.

The solution of soaps in concentrated caustic solution which settles to the bottom of settling tank 10 is removed therefrom through valved line 20 and flows to a heat exchanger or cooler 21 wherein the solution is cooled by indirect heat exchange with a suitable cooling medium to a temperature at which substantially all of the soaps will be salted out of the caustic solution of the strength employed. From cooler 21, the cooled mixture of soaps and caustic flows through line 22 to separator 23 wherein the soaps separate from the caustic solution. The soaps are withdrawn overhead through valved line 24 to soap storage tank 25, while the caustic solution is withdrawn from the bottom of separator 23 through valved line 26 to caustic surge tank 5. Any caustic solution carried over with the soaps to storage tank 25 and separating therefrom on long standing may be withdrawn therefrom through valved line 28 and introduced into the caustic surge tank 5; while any soaps carried over with the caustic solution to caustic surge tank 5 and separating therefrom on standing may be withdrawn therefrom through one of the valved draw-off lines 29 and introduced into soap storage tank 25. The strength of the caustic solution in caustic surge tank 5 may be controlled within desired limits by adding water or strong caustic solution to the material in caustic surge tank 5 through valved lines 30 or 31 respectively.

The strength of the caustic which is employed and the relative amount thereof mixed with the gas oil from which the naphthenic acids are to be removed must be such that the soaps formed are substantially completely soluble in the caustic solution at the temperature maintained in settling tank 10 but are substantially completely salted out at the temperature maintained in separator 23. If caustic of a greater than a predetermined maximum strength is employed, a portion of the soaps will be salted out of the aqueous phase in settling tank 10 and thus will remain in the oil phase and will be removed therewith. On the other hand, if caustic of a less than a predetermined minimum strength is employed and unless the solution of soaps and caustic is cooled to at least a predetermined temperature in cooler 21, substantially all of the soaps will not be salted out and thus recovered in separator 23. The maximum strength of caustic solution which may be employed without exerting a salting out effect at a given elevated temperature, but which will exert a maximum salting out effect at a given lower temperature, will vary slightly with the particular acids which it is desired to recover. Thus the source of the acids and the relative molecular weight of the acids both exert some influence on the strength of caustic solution most suitable for their purification. This is particularly true with sulfonic acids and to a somewhat lesser degree is true with other types of acids, such as naphthenic acids and acids produced by the partial oxidation of hydrocarbons. However, the particular range of strength of caustic solution which may be employed may be readily determined for the particular acids which are to be purified at any two selected temperatures.

The ratio of caustic solution to acids which may be employed, and on which the concentration of soaps in the caustic depends, may be varied through a relatively wide range. However, it should be noted that as the ratio of caustic solution to acids is increased the maximum and minimum strengths of caustic solution which may be employed are decreased, due to the greater concentration of excess caustic when the higher ratios are used.

The effect of changes in caustic strength, the optimum range of caustic strength, and the effect of ratio of caustic employed to the theoretical amount required for exact neutralization of the acids to be purified are illustrated in Fig. 2. As shown in Fig. 2 the line A—B represents the maximum strength of caustic solution which may be employed for no salting out at 200° F., while the line C—D represents the minimum strength of caustic solution which may be employed for substantially complete salting out of the soaps at 80° F., when the ratio of caustic used to the theoretical amount required for exact neutralization of the naphthenic acids is varied from three to one to about eight to one. The particular optimum range of caustic strength illustrated is that for purification of naphthenic acids present in a gas oil fraction derived from a mixture of Gulf Coast naphthenic type crude petroleum by fractional distillation. The concentration range of caustic strength which may be employed at other temperatures or with acids from other sources may readily be determined by titrating at two or more selected temperatures known synthetic mixtures of the particular soaps to be recovered and water with caustic soda and noting the points of initial and complete salting out.

The elevated temperature employed for forming an aqueous solution of the soaps and separation of this solution from the neutral oils and the somewhat lower temperature employed for salting out the soaps may be varied considerably. As stated above the temperature employed during separation of the aqueous soap phase from the oil phase must be sufficiently elevated that the soaps are substantially completely soluble in the caustic solution of the strength employed, while the lower temperature employed during salting out of the soaps must be sufficiently low that the soaps will be substantially completely salted out of the caustic solution of the strength employed. Preferably these two temperatures are sufficiently different that the temperature employed during saponification is slightly higher than the minimum temperature necessary for complete solution of the soaps in caustic of the strength employed and the strength of the caustic solution employed is maintained below the strength at which soaps will be salted out at this temperature; while the temperature employed during salting out of the soaps is preferably maintained slightly below the maximum temperature at which the soaps will be substantially completely salted out of caustic solution of the strength employed, and the strength of caustic solution employed is maintained above the strength at which the soaps will be completely salted out. The greater the difference between the two temperatures employed, the wider will be the range of strength of caustic solution that may be employed; while if too small a difference exists between the two temperatures employed, either a part of the soaps will be salted out at the elevated temperature or a portion of the soaps will remain in solution at the lower temperature.

From the foregoing it is apparent that there are three main variables to be considered in practicing the present invention, namely: temperature, strength of the caustic solution and ratio of caustic solution to soaps. The following specific examples will serve to illustrate preferred embodiments of this invention:

*Example 1.*—A gas oil obtained from a mixture of Gulf Coast crudes by fractional distillation and which contained about 2.2 pounds of naphthenic acids per barrel of gas oil and had a saponification value of 1.4 was mixed with a caustic soda solution having a Baumé gravity of 11° and a normality of 2, an amount of caustic solution equivalent to seven times that necessary to completely saponify the naphthenic acids contained in the gas oil being used. The mixing was effected at 200° F. and this temperature was maintained while the mixture was permitted to stand for a short time. It readily separated into a lower aqueous caustic phase containing substantially all of the soaps in solution therein and an upper oil phase. The two phases were drawn off separately and the aqueous caustic solution of soaps thus obtained was cooled to 80° F. At this temperature substantially all of the soaps salted out of the caustic solution and the solution separated into a lower caustic phase and an upper soap layer. The soap layer was then removed from the caustic layer. On a dry basis the soap layer contained 46 per cent neutral oil and had an equivalent saponification value of 109. It was found that at these two temperatures (200° F. and 80° F.) the caustic solution should not exceed a strength of about 2.25 normal, approximately 12° Bé., nor should it be lower than 1.7 normal, or approximately 9.6° Bé. So long as the strength of caustic was maintained between these two limits the soaps in the gas oil were completely soluble in the caustic solution at 200° F. but were substantially completely salted out of the caustic solution at 80° F.

*Example 2.*—The same gas oil as that used in Example 1 was mixed at a temperature of 200° F. with approximately four times the amount of 2.2 normal, or 11.9° Bé. caustic soda solution required for neutralization of the contained naphthenic acids. The mixture was permitted to stand and the thus formed caustic solution of soaps readily separated from the gas oil and the two layers were separately withdrawn. The caustic solution of soaps was then cooled to 80° F. and the soaps were thereby salted out of the caustic solution and readily separated therefrom. On a dry basis the soaps contained 41 per cent neutral oil and had an equivalent saponification value of 121. It was found that at a ratio of caustic solution to the theoretical amount required for exact neutralization of naphthenic acids in the gas oil of 4:1 the soaps were completely soluble in the caustic solution so long as the strength of the caustic solution did not exceed 2.45 normal, or 13.1° Bé., and on the other the soaps were substantially completely salted out of the caustic solution at 80° F. if the caustic solution was maintained above 1.9 normal, or 10.6° Bé.

*Example 3.*—Ten liters of the same gas oil as that used in Example 1 were mixed at a temperature of 200° F. with 320 cubic centimeters of 2.0 normal or 11.0° Bé. caustic soda solution, this being 2.85 times the amount required for exact neutralization of the acidic constituents. The mixture was permitted to stand at 200° F. and readily separated into an upper gas oil layer and a soap solution layer. The two layers were separately withdrawn and the soap solution layer was cooled to 80° F. The soaps salted out of solution and the resulting mixture readily separated into two layers, the upper layer being wet soaps and the lower being caustic solution, which were separately withdrawn. The wet soaps thus obtained had a weight of 120 g. and on a dry basis were equivalent to 78 g. of naphthenic acids having a saponification value of 132 and a neutral oil content of 35 per cent. The recovered caustic layer amounted to 286 c. c. and had a normality of 1.3 and a gravity of 7.4° Bé. The amount of fresh caustic and water required to bring the normality back to 2.0 and the volume to 320 c. c. was added to the recovered caustic layer and the thus strengthened caustic was used to extract the acids from another 10 liters of the gas oil, exactly the same procedure being used as before. The yield of soaps obtained in this second cycle and the quality of the soaps were substantially the same as before. The caustic recovered from the second cycle was made up to a strength of 2.0 normal and a volume of 320 c. c. and was again recycled. This procedure was carried through a total of 10 cycles. It was found that the yield and quality of soaps obtained in each cycle were substantially the same as was obtained in the first cycle.

*Example 4.*—The sour oil remaining after acid treating but before neutralization of a transformer oil derived from a mixture of Gulf Coast crudes by fractional distillation under vacuum and having a Saybolt Universal viscosity of 55 at 100° F. and containing about 3.7 pounds of sulfonic acids per barrel of oil was mixed at 200° F. with about seven times the amount of caustic soda solution required for exact neutralization of the sulfonic acids present, the caustic soda solution having the strength of about 2.6 normal. The mixture was allowed to stand at this temperature and the sulfonate soaps formed were completely soluble in the caustic solution which separated from the neutral oil. The caustic solution was removed from the oil and was cooled to 80° F. At this temperature the sulfonate soaps were completely salted out and were readily separated from the caustic solution. It was found that so long as the strength of the caustic solution after neutralization of the transformer oil did not exceed 2.45 normal or did not fall below 2.175 normal, the sulfonate soaps were completely soluble in the caustic solution at 200° F. but were completely salted out at 80° F.

While we have herein described a preferred embodiment of the present invention, various modifications thereof will be apparent to those skilled in the art. Thus, while we have described our process as being applied to oils containing saponifiable acids whose saponification is effected as a part of our process, it will be apparent that we may use as a starting material in practicing our process oils in which the acids have already been neutralized and converted into soaps, for instance in some other process. It is also apparent that our process may be combined with various known methods to produce a substantially pure product. For instance, the concentrated soaps produced by our process may be subjected to either distillation or solvent extraction to remove any neutral hydrocarbon oil that may be present and thus yield pure soaps. If desired, acids may then be obtained from the pure soaps by the usual procedure of neutralizing with a mineral acid.

We claim:

1. The method of separating saponifiable acids from a mixture of saponifiable acids and hydrocarbon oils which comprises treating said mixture with an aqueous solution of an alkali metal hydroxide in substantial excess of the amount required for complete neutralization of the acids, thereby to convert the aforesaid acids to alkali metal soaps and form a mixture comprising an oil phase and an aqueous phase containing excess alkali metal hydroxide, the ratio of said solution to acids and the alkali metal hydroxide strength of the solution being such that within a given temperature range a predominant proportion of the soaps will be soluble in the aqueous phase while within a substantially lower temperature range a predominant proportion of the soaps will be insoluble in the aqueous phase due to said excess of alkali metal hydroxide, separating the oil phase from the aqueous phase while the phases are within said higher temperature range, directly cooling the aqueous phase to within said lower temperature range thereby to precipitate a predominant proportion of the soaps, and separating the precipitated soaps from the resultant aqueous layer.

2. The method defined in claim 1 wherein the saponifiable acids are naphthenic acids.

3. The method defined in claim 1 wherein the saponifiable acids are sulfonic acids.

4. The method defined in claim 1 wherein the saponifiable acids are acids derived by partial oxidation of hydrocarbons.

5. The method defined in claim 1 further characterized in that fresh alkali metal hydroxide is added to said resultant aqueous layer to form a solution containing alkali metal hyroxide in a concentration substantially equivalent to that of the original alkali metal hydroxide solution and in that a mixture of saponifiable acids and hydrocarbon oil is treated with the so-formed solution for further separation of acids in the manner specified.

6. The method of separating naphthenic acids from a mixture of naphthenic acids and hydrocarbon oil which comprises treating said mixture with an aqueous solution of an alkali metal hydroxide in amount not less than two times the amount required for complete neutralization of the acids and having a strength of 1.45 normal to 2.65 normal, thereby to convert the aforesaid acids to alkali metal soaps and form a mixture comprising an oil phase and an aqueous phase containing excess alkali metal hydroxide, separating the oil phase from the aqueous phase while the phases are within a temperature range at which a predominant proportion of the soaps are soluble in the aqueous phase, directly cooling the aqueous phase to within a temperature range at which a predominant proportion of the soaps are insoluble in the aqueous phase thereby to precipitate soaps, and separating the precipitated soaps from the resultant aqueous layer.

7. The method of separating naphthenic acids from a mixture of naphthenic acids and hydrocarbon oil which comprises treating said mixture with an aqueous solution of an alkali metal hydroxide in amount between two and ten times the amount required for complete neutralization of the acids and having a strength within the range of 2.05 normal to 2.65 normal when two times the amount is used to within the range of 1.45 normal to 2.05 normal when ten times the amount is used, thereby to convert the aforesaid acids to alkali metal soaps and form a mixture comprising an oil phase and an aqueous phase containing excess alkali metal hydroxide, separating the oil phase from the aqueous phase while the phases are within a temperature range at which a predominant proportion of the soaps are soluble in the aqueous phase, directly cooling the aqueous phase to within a temperature range at which a predominant proportion of the soaps are insoluble in the aqueous phase thereby to precipitate soaps, and separating the precipitated soaps from the resultant aqueous layer.

8. The method of separating soaps from a mixture of alkali metal soaps and hydrocarbon oil which comprises commingling said mixture with an aqueous solution of an alkali metal hydroxide, thereby to form a mixture comprising an oil phase and an aqueous phase containing alkali metal hydroxide, the ratio of said solution to soaps and the alkali metal hydroxide strength of the solution being such that within a given temperature range a predominant proportion of the soaps will be soluble in the aqueous phase while within a substantially lower temperature range a predominant proportion of the soaps will be insoluble in the aqueous phase due to the presence of the alkali metal hydroxide, separating the oil phase from the aqueous phase while the phases are within said higher temperature range, directly cooling the aqueous phase to within said lower temperature range thereby to precipitate a predominant proportion of the soaps and separating the precipitated soaps from the resultant aqueous layer.

9. The method defined in claim 8 wherein the soaps are soaps of naphthenic acids, the aqueous solution of alkali metal hydroxide has a strength within the range of 1.45 normal to 2.65 normal and the proportion of said solution is such that the alkali metal hydroxide is in substantial excess of the amount which would be required for complete neutralization of the acids corresponding to the soaps.

10. The method defined in claim 8 further characterized in that said resultant aqueous layer is commingled with a mixture of alkali metal soaps and hydrocarbon oil for further separation of soaps in the manner specified.

11. The method of separating saponifiable material from a mixture thereof with hydrocarbon oil which comprises treating said mixture under saponifying conditions with an aqueous solution of an alkali metal hydroxide in substantial excess of the amount required for complete saponification, thereby to convert the aforesaid saponifiable material to alkali metal soaps and form a mixture comprising an oil phase and an aqueous phase containing excess alkali metal hydroxide, the ratio of said solution to saponifiable material and the alkali metal hydroxide strength of the solution being such that within a given temperature range a predominant proportion of the soaps will be soluble in the aqueous phase while within a substantially lower temperature range a predominant proportion of the soaps will be insoluble in the aqueous phase due to said excess of alkali metal hydroxide, separating the oil phase from the aqueous phase while the phases are within said higher temperature range, directly cooling the aqueous phase to within said lower temperature range thereby to precipitate a predominant proportion of the soaps, and separating the precipitated soaps from the resultant aqueous layer.

12. Method of extracting naphthenic acids from gas oil containing the same which comprises mixing the gas oil, at a temperature approximating 200° F., with an aqueous solution of caustic soda having a strength approximating 2 normal, said caustic soda solution being used in an amount approximating seven times the amount, at the specified strength, required for complete neutralization of the naphthenic acids, thereby to convert the acids to sodium soaps and form a mixture comprising a gas oil phase and an aqueous caustic soda phase containing the soaps, settling the mixture at a temperature not substantially different from the mixing temperature to separate the caustic soda phase from the gas oil, directly cooling the caustic soda phase to a temperature adequate to precipitate the soaps, and separating the precipitated soaps from the resultant caustic soda layer.

WILMER E. McCORQUODALE, Jr.
LLOYD G. MAGILL.
JAMES D. HAGY.

REFERENCES CITED

The following references are of record in the file of this patent:

UNITED STATES PATENTS

| Number | Name | Date |
|---|---|---|
| 2,251,819 | Burk et al. | Aug. 5, 1941 |
| 1,828,356 | Burwell | Oct. 20, 1931 |
| 1,984,432 | Robinson | Dec. 18, 1934 |
| 1,886,647 | Coleman | Nov. 8, 1932 |
| 1,681,237 | James | Aug. 21, 1928 |
| 2,322,012 | Frolich | June 15, 1943 |
| 2,136,608 | Blount | Nov. 15, 1938 |
| 2,131,938 | Donker | Oct. 4, 1938 |
| 2,220,013 | Bruun | Oct. 29, 1940 |
| 1,694,461 | Alleman | Dec. 11, 1928 |
| 2,288,769 | Alleman et al. | July 7, 1942 |

OTHER REFERENCES

Kalichevsky-Stagner, "Chem. Refining of Petroleum" (rev. ed.), (1942), pp. 160–164, 168. (Copy in Division 31.)